(12) United States Patent
Zhou

(10) Patent No.: US 7,753,672 B2
(45) Date of Patent: Jul. 13, 2010

(54) MOLD HAVING LOCKING MECHANISMS

(75) Inventor: Cheng-Gui Zhou, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 122 days.

(21) Appl. No.: 12/241,187

(22) Filed: Sep. 30, 2008

(65) Prior Publication Data

US 2009/0169670 A1  Jul. 2, 2009

(30) Foreign Application Priority Data

Dec. 29, 2007  (CN) .................. 2007 1 0203552

(51) Int. Cl.
*B29C 51/38* (2006.01)
(52) U.S. Cl. .............. 425/193; 425/387.1; 425/388; 425/DIG. 48; 425/DIG. 129
(58) Field of Classification Search .............. 425/193, 425/387.1, 388, DIG. 48, DIG. 129
See application file for complete search history.

(56) References Cited

U.S. PATENT DOCUMENTS

| 4,684,101 A | * | 8/1987 | Wagner et al. | .............. 425/193 |
| 4,842,506 A | * | 6/1989 | Coutier | .................. 425/193 |
| 5,002,477 A | * | 3/1991 | Case et al. | ............... 425/193 |
| 5,078,586 A | * | 1/1992 | Holzschuh | .............. 425/192 R |

* cited by examiner

*Primary Examiner*—James Mackey
(74) *Attorney, Agent, or Firm*—Steven M. Reiss

(57) ABSTRACT

A mold structure (100) includes a press board (20), a lower mold (10) and at least one locking mechanism (40) configured for locking the press board to the lower mold. The at least one locking mechanism includes a locking element (41), a slidable block (46) and a driven apparatus (42). The locking element engages with the press board and the lower mold along a first direction. The locking element defines a locking hole (4124). The slidable block engages in the locking hole along a second direction. The driven apparatus drives the slidable block to move along the second direction for pressing the press board to the lower mold along the first direction.

12 Claims, 5 Drawing Sheets

MOLD HAVING LOCKING MECHANISMS

BACKGROUND OF THE INVENTION

1. Field of the Invention

The present invention relates to molds having locking mechanisms.

2. Discussion of the Related Art

Portable electronic devices, such as mobile telephones, personal digital assistants, and MP3 players, enable consumers to enjoy the convenience of high technology services, almost anytime and at virtually any location. These electronic devices often employ a variety of decorative housings to attract consumers. Most of the decorative housings are molded articles manufactured using an injection molding process. Decorative films can be applied onto surfaces of the housings to provide the desired decorative appearance.

During the forming process, the decorative film needs to be pressed to a mold core on a lower mold plate using a press board, and the press board is locked with the lower plate using a locking mechanism to tightly press the film. Then, the film is baked to be softened. After that, a vacuum inhaling apparatus creates a vacuum allowing the film to be tightly kept close to the lower plate. Finally, the press board is removed, and an upper mold plate is closed against the lower mold plate to complete the film mounting process.

However, since the film might be stretched during the baking process, the conventional press board has no further press function, thereby causing the film not to tightly attach to the lower mold plate.

Therefore, there is room for improvement in the art.

DETAILED DESCRIPTION OF THE EXEMPLARY EMBODIMENTS

Figure 1:
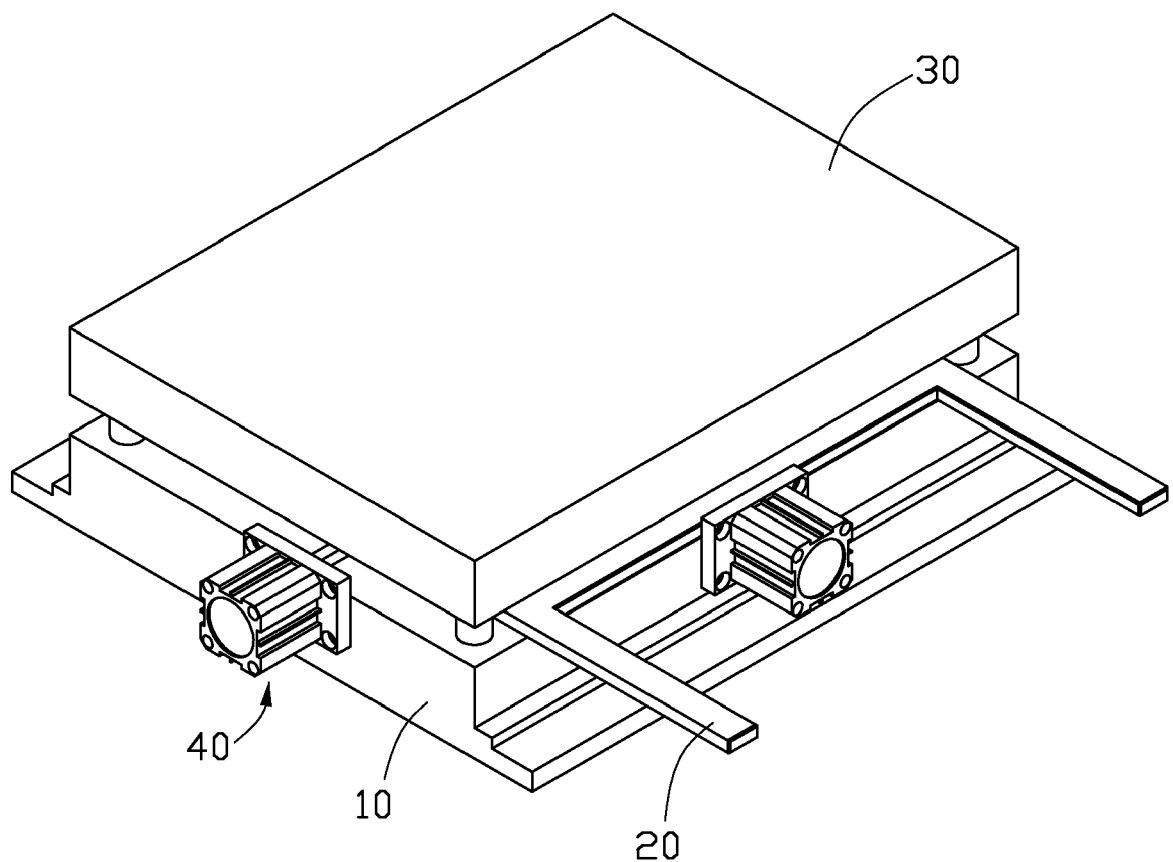
FIG. 1 shows an assembled schematic view of an exemplary embodiment of the mold structure.

FIG. 1 shows a mold 100, in one exemplary embodiment that includes a lower mold seat 10, a press board 20, an upper mold 30 and three locking mechanisms 40.

Figure 2:
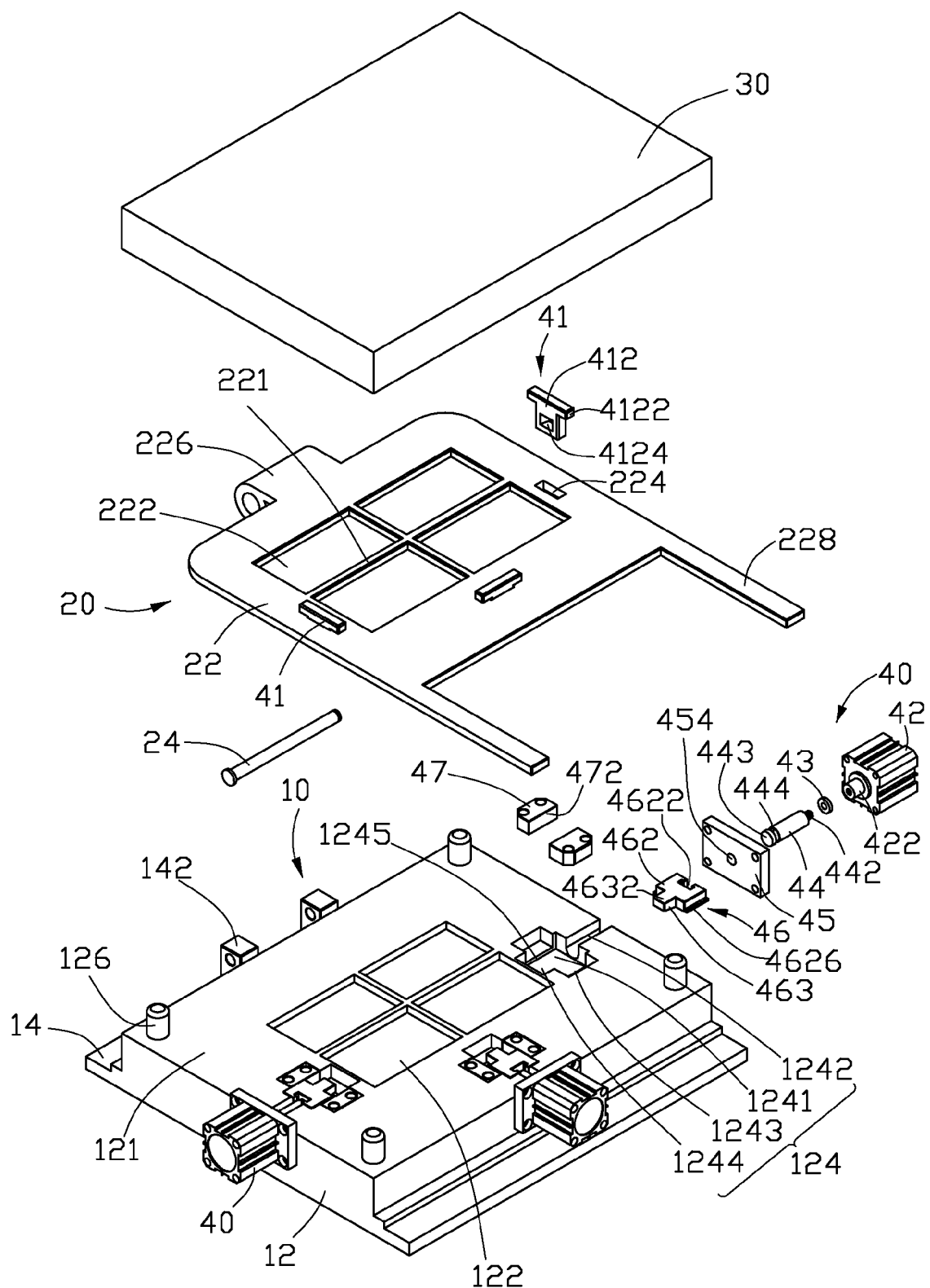
FIG. 2 shows an exploded, schematic view of an exemplary embodiment of the present molded structure.

Referring to FIG. 2, the lower mold seat 10 includes a rectangular lower mold 12 and two stepped flanges 14 formed on two sides of the lower mold 12. The lower mold 12 has a parting surface 121, which defines four mold cavities 122 and three grooves 124. The mold cavities 122 are positioned at a central area thereof, and the three grooves 124 are respectively arranged at three sides of the lower mold 12. A post 126 is respectively formed at each corner of the lower mold 12. One of the stepped flanges 14 form two spaced hinged seats 142 for rotatably connecting the press board 20 to the lower mold seat 10.

Each groove 124 includes a middle groove 1241, a through groove 1242, two side grooves 1243 and a top groove 1244. The two side grooves 1243 are respectively defined at two sides of the middle groove 1241. The through groove 1242 and the top groove 1244 are defined at another two sides of the middle groove 1241. A bottom wall of the middle groove 1241 is deeper than that of the side grooves 1243, thereby forming a step 1245 therebetween.

Each press board 20 includes a main body 22 defining four latching holes 222. The arrangement and size of the four latching holes 222 corresponds to those of the mold cavities 122. The main body 22 defines three receiving holes 224 respectively corresponding to the top grooves 1244. A barrel 226 extends from one side of the main body 22. The barrel 226 is used for rotatably connecting between the two hinged seats 142 by means of a pivot shaft 24. Two arms 228 extend from the other side of the main body 22 for conveniently operating the press board 20.

Figure 3:
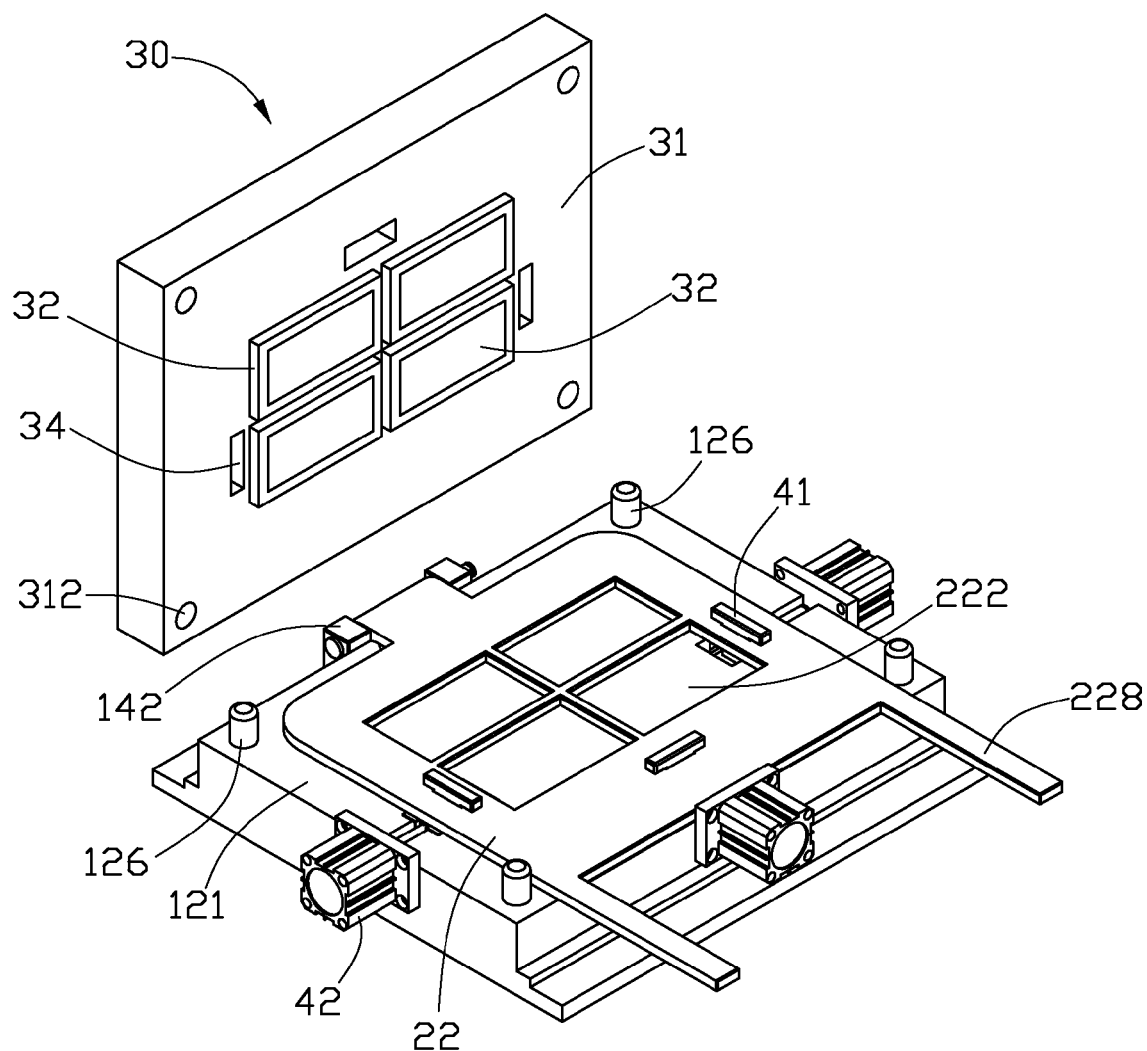
FIG. 3 shows a partially assembled schematic view of FIG. 2.

Referring to FIG. 3, the upper mold 30 has an end surface 31 forming four protrusions 32. The four protrusions 32 correspond to the four mold cavities 122. The upper mold 30 defines three slots 34 adjacent to the protrusions 32 corresponding to the receiving holes 224 of the press board 20. The upper mold 30 defines four guiding hole 312 for receiving the post 126.

Each locking mechanism 40 includes a locking element 41, a driven apparatus 42, a washer 43, a shaft 44, a baffle board 45, a slidable block 46 and two guiding elements 47.

The locking element 41 is substantially T-shaped, and is configured for engaging in a corresponding receiving hole 224. The locking element 41 includes a main portion 412 and a flange portion 4122 formed at one side thereof. The main portion 412 defines a locking hole 4124. The locking hole 4124 is a trapezoidal shape, and the incline angle of the angles sides are each about 10 degrees. The flange portion 4122 is used for being received in a corresponding slot 34.

The driven apparatus 42 is a cylinder in this exemplary embodiment, and includes a piston rod 422. The piston rod 422 has an inner thread at one end thereof. The shaft 44 is substantially cylindrical, and includes an extending end 442 and a latching end 443. The extending end 442 defines an outer thread for threadly connecting to the piston rod 422. Washer 43 may be disposed between the piston rod 422 and the extending end 442 for adjusting the length of the driven apparatus 42. The latching end 443 defines a loop groove 444 for connecting with the slidable block 46.

The baffle board 45 is used for fixing the driven apparatus 42 to the lower mold seat 10. The baffle board 45 defines a central hole 454 allowing the piston rod 422 to pass through the baffle board 45.

The slidable block 46 includes a main section 462 and a subsidiary section 463. The main section 462 defines a latching groove 4622 for fixedly receiving the latching end 443. The subsidiary section 463 is a trapezoidal block including two sloped surfaces 4632 configured for engaging in the locking hole 4124. The main section 462 forms two wings 4626 at two sides thereof.

Figure 4:
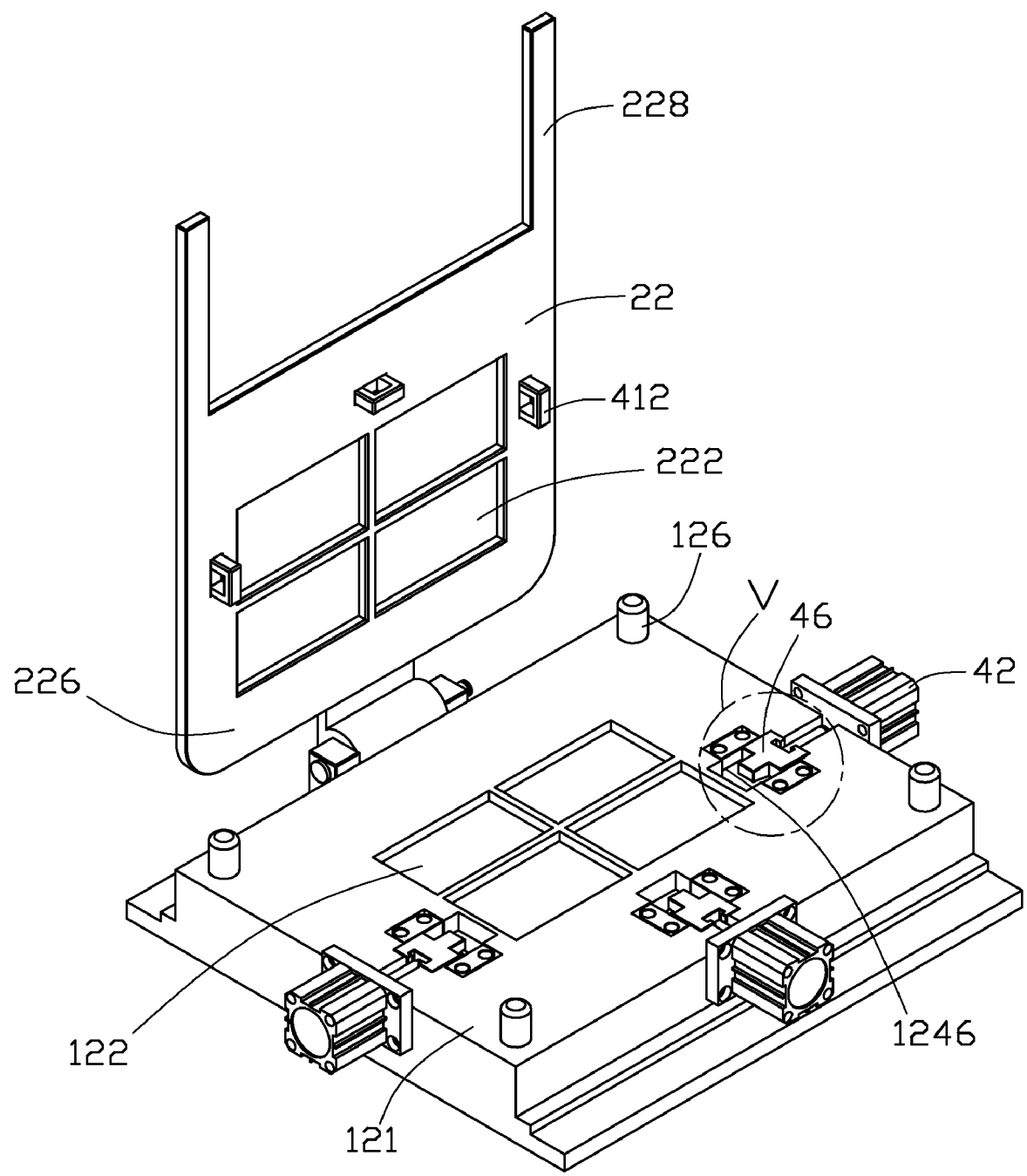
FIG. 4 shows a schematic view of the mold structure after the press board is opened relative to the lower mold plate.
Figure 5:
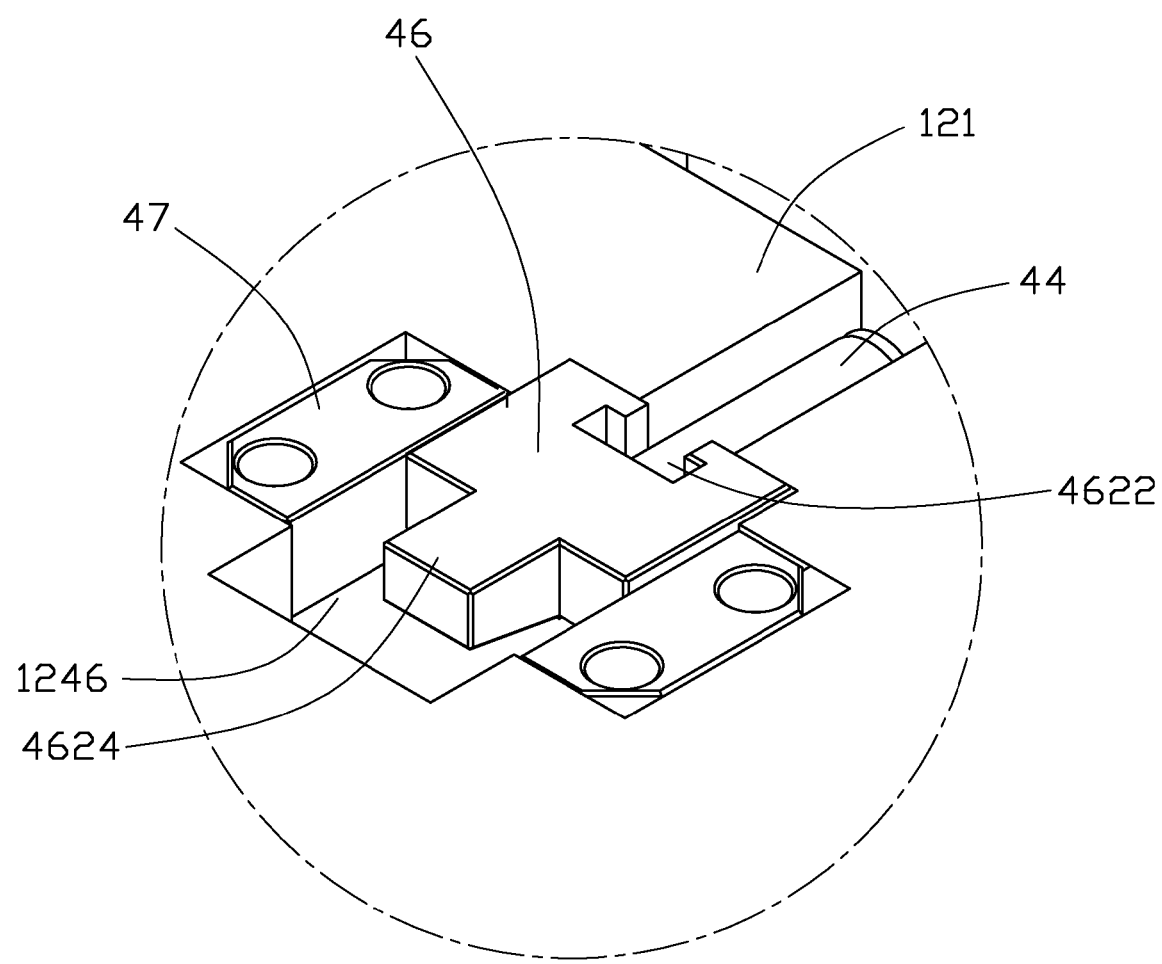
FIG. 5 shows an enlarged view in V area of FIG. 4.

The guiding element 47 is configured for being received in the side groove 1243. The guiding element 47 has a guiding surface 472. Referring to FIGS. 4 and 5, when each guiding element 47 is engaged in the side groove 1243, the guiding element 47 with the step 1245 surrounds a positioned groove 1246 for receiving the wing 4626 of the slidable block 46, thereby allowing the slidable block 46 to perpendicularly move between the guide surfaces 472.

When assembling the mold 100, firstly, the guiding elements 47 are respectively fixed in the side grooves 1243. Then, the slidable block 46 is received in the middle groove 1241, and at the same time, the wings 4626 are received in the positioned grooves 1246 for limiting the slidable block 46 to move between the guiding surfaces 472 of the guiding elements 47. After that, the driven apparatus 42, the washer 43, the shaft 44 and the baffle board 45 are together. The shaft 44 is received in the through groove 1242, and the latching end 443 of the shaft 44 is fixedly received in the latching groove 4622. The assembly process of the other two locking mechanisms 40 is similar to the above description.

Then, the press board 20 is rotatably to the hinged seat 142 of the lower mold seat 10 by means of the pivot shaft 24. The press board 20 is rotated to press the lower mold 12. The latching holes 222 are aligned with the mold cavities 122. The receiving holes 224 are aligned with the top grooves 1244. After that, the main sections 412 of the locking elements 41 pass through the receiving holes 224, and are received in the top grooves 1244. The upper mold 20 is closed relative to the lower mold 10. The flange sections 4122 are received in the slots 34.

When mounting the film, the upper mold 30 is opened relative to the lower mold 10. The operator uses arms 228 to rotate the press board 20 out of the way. The film is placed to cover the mold cavities 122 of the lower mold 12. Then, the press board 20 is rotated back into position to press the film. The driven apparatus 42 are activated, and the piston rods 422 push the slidable blocks 46 to move. Since the subsidiary sections 463 is received in the locking hole 4124 with sloping engagement, the movement of the slidable blocks 46 forces the press board 20 against the film. Then, the film is baked. Since the driven apparatus 42 always apply a force to the slidable blocks 46, the blocks 46 have tendency to keep increasing the force by which the pressing board 22 presses against the lower mold 21. Thus, as the film softens to be stretched, the slidable blocks 46 will maintain the pressing of the film.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mold structure comprising:
   a press board;
   a lower mold;
   at least one locking mechanism configured for locking the press board to the lower mold; the at least one locking mechanism comprising:
   a locking element engaging with the press board and the lower mold along a first direction, the locking element defining a locking hole;
   a slidable block engaging in the locking hole along a second direction;
   a driven apparatus driving the slidable block to move along the second direction for pressing the press board to the lower mold along the first direction.

2. The mold structure as claimed in claim 1, wherein the locking hole is a trapezoidal shaped hole and the slidable block includes a trapezoidal block for being received in the trapezoidal hole.

3. The mold structure as claimed in claim 1, wherein the lower mold defines a groove including a middle groove, a through groove, two side grooves and a top groove, the two side grooves are respectively defined at two sides of the middle groove, and the through groove and the top groove are defined at another two sides of the middle groove.

4. The mold structure as claimed in claim 3, wherein the locking element engages in the top groove, and the slidable block engages in the middle groove.

5. The mold structure as claimed in claim 4, further comprising two guiding elements, each guiding element engages in a corresponding side groove, and the slidable block is disposed between the guiding elements.

6. The mold structure as claimed in claim 1, wherein the locking mechanism further comprises a shaft, and the shaft connects the driven apparatus to the slidable block.

7. A mold structure comprising:
   a lower mold defining a groove;
   a press board rotatably attached to the lower mold, the press board defining a slot;
   a locking mechanism configured for locking the press board to the lower mold; the locking mechanism comprising:
   a locking element passing through the slot and engaging in the groove, the locking element defining a locking hole;
   a slidable block received in the groove, and engaging in the locking hole;
   a driven apparatus driving the slidable block to move in the groove for pressing the press board to the lower mold.

8. The mold structure as claimed in claim 7, wherein the groove includes a middle groove, a through groove, two side grooves and a top groove, the two side grooves are respectively defined at two sides of the middle groove, and the through groove and the top groove are defined at another two sides of the middle groove.

9. The mold structure as claimed in claim 8, wherein the locking element engages in the top groove, and the slidable block engages in the middle groove.

10. The mold structure as claimed in claim 8, further comprising two guiding elements, each guiding element engages in a corresponding side groove, and the slidable block is disposed between the guiding elements.

11. The mold structure as claimed in claim 7, wherein the locking mechanism further comprises a shaft, and the shaft connects the driven apparatus to the slidable block.

12. The mold structure as claimed in claim 7, wherein the locking hole is a double trapezium hole and the slidable block includes a double trapezium block for being received in the double trapezium hole.

* * * * *